May 1, 1934.  L. CASTELAIN  1,956,667
APPARATUS FOR THE STERILIZATION OF MILK
BY THE ACTION OF ULTRAVIOLET LIGHT
Filed June 25, 1932   2 Sheets-Sheet 2
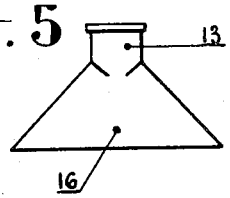
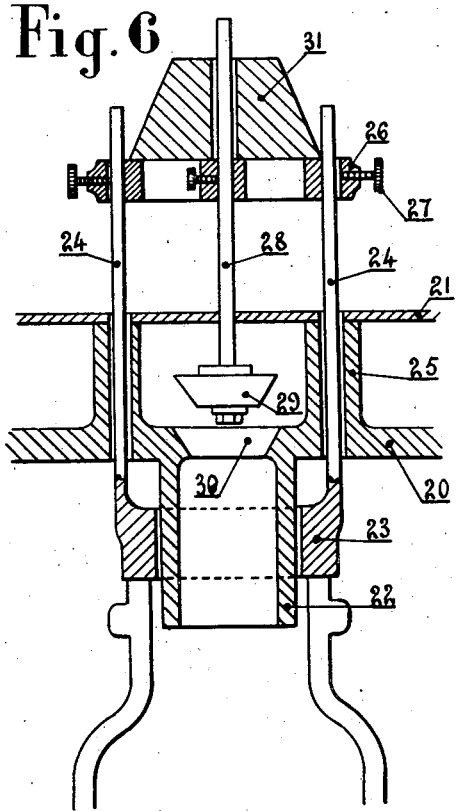
Inventor:
Louis Castelain
by   S. Sokal
   Attorney.

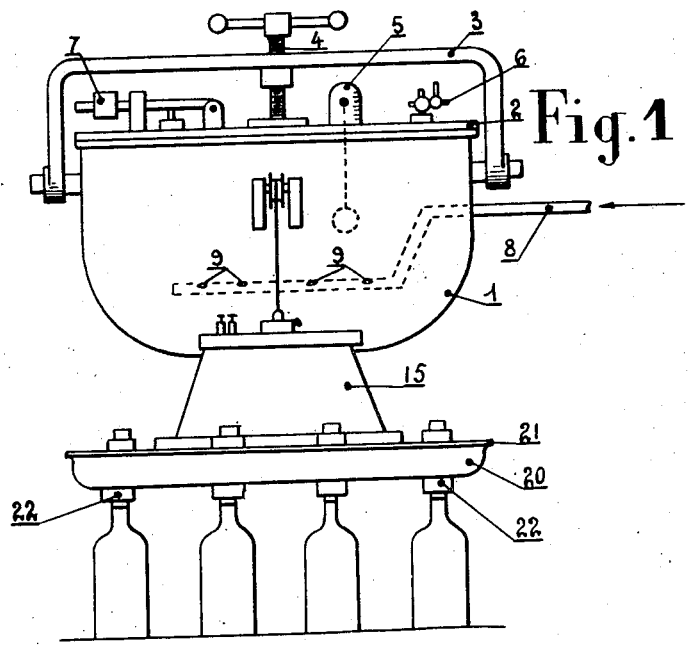
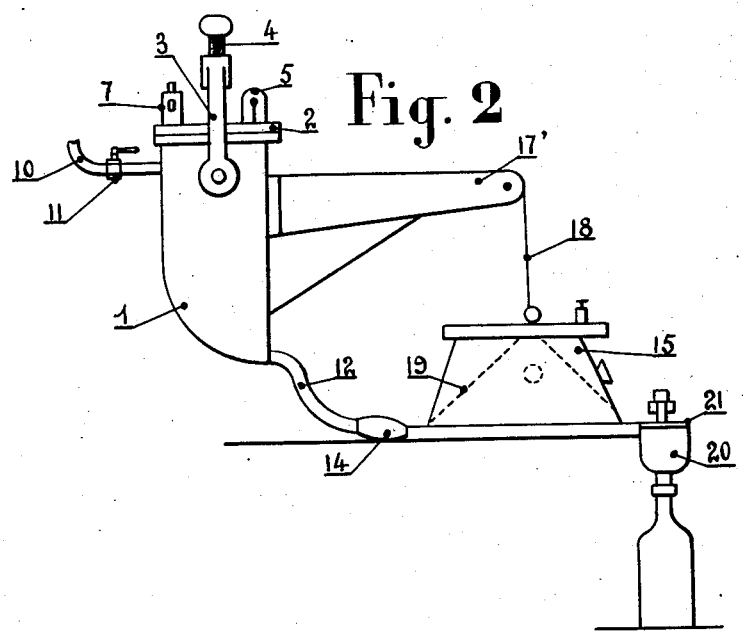

Patented May 1, 1934

1,956,667

UNITED STATES PATENT OFFICE 1,956,667

APPARATUS FOR THE STERILIZATION OF MILK BY THE ACTION OF ULTRAVIOLET LIGHT

Louis Castelain, Tourcoing, France

Application June 25, 1932, Serial No. 619,214
In France July 1, 1931

5 Claims. (Cl. 99—2)

Up to the present time, there were already apparatus for the sterilization of milk, several of them employing the action of ultra-violet light, but these apparati were discharged by gravity and it was practically impossible to regulate this discharge in a suitable manner, in accordance with the fat contents of the milk.

Besides, certain points of the stream may have been in contact with the atmospheric air containing bacteria so that the sterilization could not be realized in a perfect manner.

The radiation output was not complete on account of necessities of construction and especially on account of utilizing a transparent envelope between the source of the light and the milk.

These apparati were not skilful with regard to dismounting and cleaning which was a further defect of security.

The object of the present invention is to provide improvements in order to remedy to these defects.

The invention provides an apparatus for the sterilization of milk by the action of ultra-violet light, this apparatus being characterized by the following features: it works under the complete protection from the air at the pressure of carbonic acid; the milk is divided in homogeneous flat jets which passes under the source of ultra-violet light; the radiation power of the light source is much superior; the apparatus comprises a device for filling bottles, cans or other receptacles.

The accompanying drawings show by way of example one embodiment of the present invention.

Fig. 1 is an elevation of the complete apparatus.

Fig. 2 is a side elevation of the same.

Fig. 3 is a sectional view of the expansion mouth of the liquid.

Fig. 4 is a front view of the same and

Fig. 5 a plan view thereof.

Fig. 6 is a part sectional view of the outlet-channel for emptying the sterilized milk and of the device forming a kind of valve actuated by means of the neck of the bottle or the like.

Referring to the Fig. 1, the apparatus comprises a hermetical receptacle 1, which may be made of any suitable materials and preferably of enamelled cast-iron. This receptacle consists of a tub closed by means of a lid or cover which is preferably secured to the tub by means of a climber 3 and one or a plurality of screws 4.

This receiver is provided with all the fittings generally applied to tight receptacles and comprising substantially a float 5, a decompression cock 6 which may particularly be connected to a control device, such as a suitable recording barometer and a safety-valve 7 which may comprise a counterweight, as it is represented by Fig. 1.

Into the inside of the receiver enters a tube 8 with any suitable number of holes such as 9; this tube serves to introduce an inactive gas, preferably carbonic gas into the said receiver by means of an adjustable pressing device of known construction.

This tube permits the gas to be introduced by way of bubbling which causes the stirring of the liquid mass to be treated.

Into this receiver leads also another tube shown in 10 (Fig. 2) which is provided with an inlet-cock 11 for feeding the milk to be sterilized.

Due to the pressure and the weight of the liquid and by means of a tube 12 which is attached to the lower part of the receiver, the liquid is discharged and passes through this tube to one or a plurality of expansion mouths 14, the end of the latter having its outlet in a tight part on the bottom of the casing 15 which shelters the source of ultra-violet light. The said expansion mouth or mouths are more completely shown in the Figures 3, 4 and 5.

Such an expansion mouth consists accordingly to these figures of a cylindrical part 13 and of a flat and widened part 16 provided with a slit 17 so as to produce an extremely fine jet under the discharge pressure of the liquid, thus constituting a kind of spray.

The source of the ultra-violet light is placed into a casing 15 which may be movable in the vertical direction by means of any suitable arm 17' and a suspension device 18 fixed on this arm.

The casing may be provided with an aperture protected by a suitable screen permitting the control of the light source and the outlet of the liquid.

In the interior of the casing is mounted a parabolic reflector 19; the emitting tube is disposed in the focus of this reflector so that the rays are projected perpendicularly on the surface of the liquid jet passing on the bottom of the casing 15.

The bottom of the casing may preferably be slightly inclined so that the liquid is allowed to pass into a channel 20 also tightly closed by means of a lid or cover 21 and provided with a certain number of nozzles 22 of suitable diameter to be employed for the filling of any receptacles suitable to contain milk such as cans, bottles or the like.

The Figure 6 shows the filling device applied for instance to a bottle.

The latter device may be of any suitable number and fixed on the channel receiving the milk. The said devices comprise a neck 22 which enter with a play into the receptacle to be filled and are fastened to the channel 20 or are made in one piece with the latter.

Around this neck, which is preferably of circular section, there is provided a ring 23 bearing any suitable number of rods 24 which pass through the channel 20 by means of swingles 25 so as to avoid any penetration of air.

These rods bear on their top ends a plate or collar 26 which is fixed to them by any known means and preferably by means of a regulating screw 27.

This plate or collar is fastened to a perpendicular rod 28 which is parallel to the rods 24 and which carries on its lower end a valve 29; this valve may descend upon a seat 30 provided on the channel 20 or on the neck 22 if the latter is inserted in the channel.

The collar or plate 26 may be charged by a suitable counterbalancing weight 31.

It will be obvious that when no receptacle is applied to the neck 22 the ring will be located in the lower position into which it will have descended owing to the action of the counter-balancing weight 11, and the valve will completely cover up the passage for the liquid into the neck.

If however, a receptacle will be introduced, it will lift the ring and by its medium the valve and consequently the sterilized liquid is allowed to fill the receptacle.

In the case of particular utilization for other receptacles than the bottles, one can key the valves in their position of aperture by interposing a key between the collar 26 and the lid 21 of the channel.

The channel may also comprise one or a plurality of drain-cocks of any known type.

All the pieces of the apparatus may be dismountable by means of any known devices and made of any suitable materials, preferably however enamelled cast-iron in order to permit an easy and aseptic cleaning.

The source of ultra-violet light which projects its rays perpendicularly to the liquid jet may be made more efficient by means of fluorescent products spread over the surface of the parabolic reflector.

A fluorescent layer may be obtained in the following manner given solely by way of example:

| | Grams |
|---|---|
| Pulverized lime | 20 |
| Sulphur, preferably hollow shots | 5 |
| Dextrine obtained from starch in the usual known manner | 2 |
| Sulphite of sodium | 0.5 |
| Neutral potash sulphate | 0.5 | forming a paste diluted by means of 0.5% of alcohol.

To this paste, one adds several drops of sulphuric acid of 40°, then a saturated solution of thalium sulphide and about 0.5% of water.

One obtains thus a total reflection of the ultra-violet rays and a kind of secondary light due to the possibility of this substance to store the rays and to return them thereon.

One obtains also a strict regularity in the working of the apparatus and an absolute security whatever may be the amount of the fat parts contained in the milk to be sterilized, for the discharge of the milk may be regulated by the pressure of gas introduced into the receiver.

It is obvious that the forms of the different containers and envelopes or channels, the details of construction, the materials employed, the arrangement of the different auxiliaries, the substances constituting the revetment of the reflector, the positions of the valve seats of the channels and the measuring of the different parts of the apparatus may be modified within the limits of the present invention.

I claim:

1. An apparatus for the sterilization of milk by the action of ultra-violet light, comprising a receiver, a tube entering the said receiver, holes in said tube for introducing an inactive gas into the receiver, a second tube on said receiver for introducing milk into the latter, an inlet-cock on said second tube, a third tube on said receiver for discharging milk therefrom, expansion nozzles forming prolongations of said last named tube and having their outlets in a fluid tight part on the bottom of the casing containing the source of ultra-violet light, a hermetically sealed channel, discharging tubes on said channel, and means for opening said discharging tubes automatically when receptacles to be filled are applied to the outlet ends of said tubes.

2. An apparatus as claimed in claim 1 wherein said expansion nozzles are provided with a flat and widened neck and a slot in this neck.

3. An apparatus as claimed in claim 1, comprising a parabolic reflector, a fluorescent substance on the said reflector for the storage of the ultra-violet rays which are returned later on and an ultra-violet ray lamp placed in the focus of the said reflector.

4. An apparatus as claimed in claim 1, comprising one or a plurality of necks on the bottom of said hermetically sealed channel, a sliding ring on each neck, a rod combined with said ring, sleeves on said channel, the said sleeves having passageways for the rods, a ring and a collar on the top end of each rod, a counterbalancing weight carried by the said ring or collar, a rod carried by the counterbalancing weight and passing through the lid or cover of the channel, a valve fixed to the end of the said rod, and a seat for said valve on the inlet-side of the neck.

5. An apparatus for sterilizing milk by the action of ultra-violet light, comprising in combination: a receiver; means for introducing gas under controlled pressure into said receiver, preferably by causing it to bubble through the milk; means for introducing milk into said receiver; nozzles receiving milk from said receiver; a casing into which milk is discharged from said nozzles in a thin stream; an ultra-violet ray lamp in said casing; a reflector in said casing having a fluorescent internal coating and co-operating with said lamp to throw ultra-violet rays on to the milk; a hermetically sealed channel into which the milk passes; a plurality of discharging tubes on said channel; and a valve on each of said discharging tubes adapted to be opened when a receptacle which is to be filled is applied to the outlet of the tube.

LOUIS CASTELAIN.